US 6,690,524 B1

(12) United States Patent
Wakefield et al.

(10) Patent No.: US 6,690,524 B1
(45) Date of Patent: Feb. 10, 2004

(54) DATA RECOVERY IN A DISC DRIVE WITH REDUNDANT SYNC DATA BLOCKS

(75) Inventors: Shawn Alan Wakefield, Norman, OK (US); Jimmie Ray Shaver, Yukon, OK (US); Brett Alan Sloan, Edmond, OK (US)

(73) Assignee: Seagate Technology LLC, Scotts Valley, CA (US)

(*) Notice: Subject to any disclaimer, the term of this patent is extended or adjusted under 35 U.S.C. 154(b) by 4 days.

(21) Appl. No.: 09/620,424

(22) Filed: Jul. 20, 2000

Related U.S. Application Data

(63) Continuation of application No. 09/036,739, filed on Mar. 9, 1998, now Pat. No. 6,097,561.
(60) Provisional application No. 60/062,194, filed on Oct. 16, 1997.

(51) Int. Cl.[7] ................................................ G11B 5/09
(52) U.S. Cl. ........................................................ 360/51
(58) Field of Search ............................... 360/51, 49, 48, 360/55, 46

(56) References Cited

U.S. PATENT DOCUMENTS

| | | |
|---|---|---|
| 5,047,876 A | 9/1991 | Holsinger et al. |
| 5,136,439 A | 8/1992 | Weispfenning et al. |
| 5,262,907 A | 11/1993 | Duffy et al. |
| 5,276,662 A | 1/1994 | Shaver, Jr. et al. |
| 5,422,760 A | 6/1995 | Abbott et al. |
| 5,459,757 A | 10/1995 | Minuhin et al. |
| 5,592,340 A | 1/1997 | Minuhin et al. |
| 5,627,843 A | 5/1997 | Deng et al. |
| 5,631,999 A | 5/1997 | Dinsmore |
| 5,812,335 A | 9/1998 | Kool et al. |
| 5,844,920 A | 12/1998 | Zook et al. |
| 5,940,233 A | 8/1999 | Malone, Sr. |
| 6,097,561 A | * 8/2000 | Wakefield et al. ............ 360/51 |

OTHER PUBLICATIONS

Finch and Moczarny, "Headerless disk formatting: Making room for more data", Data Storage Magazine, Apr. 1997, pp. 51,52,54, Pennwell Publishing Co., Tulsa, Oklahoma.*

* cited by examiner

Primary Examiner—Alan Faber
(74) Attorney, Agent, or Firm—Kirk A. Cesari

(57) ABSTRACT

An apparatus and method are disclosed for improving data recovery operations in a disc drive employing a redundant sync data block format. The disc drive includes a rotatable disc and a controllably positionable head which is used to store user data in a plurality of data blocks on tracks of the disc. Each data block includes a user data field to store user data, a first sync field and a redundant, second sync field, the sync fields storing first and second sync words, respectively, which establish symbol boundaries used by a read channel of the disc drive. User data are recovered from a selected data block by initiating a delay of selected duration during which a first portion of the selected data block passes proximate the head, allowing the second, remaining portion of the selected data block to be read at the completion of the delay. Data can thus be recovered in the presence of mis-sync errors, wherein a selected sync word is detected early or late by one or more bits, as well as from non-contiguous data blocks that are split into two fragments to accommodate a coincident servo block.

1 Claim, 7 Drawing Sheets

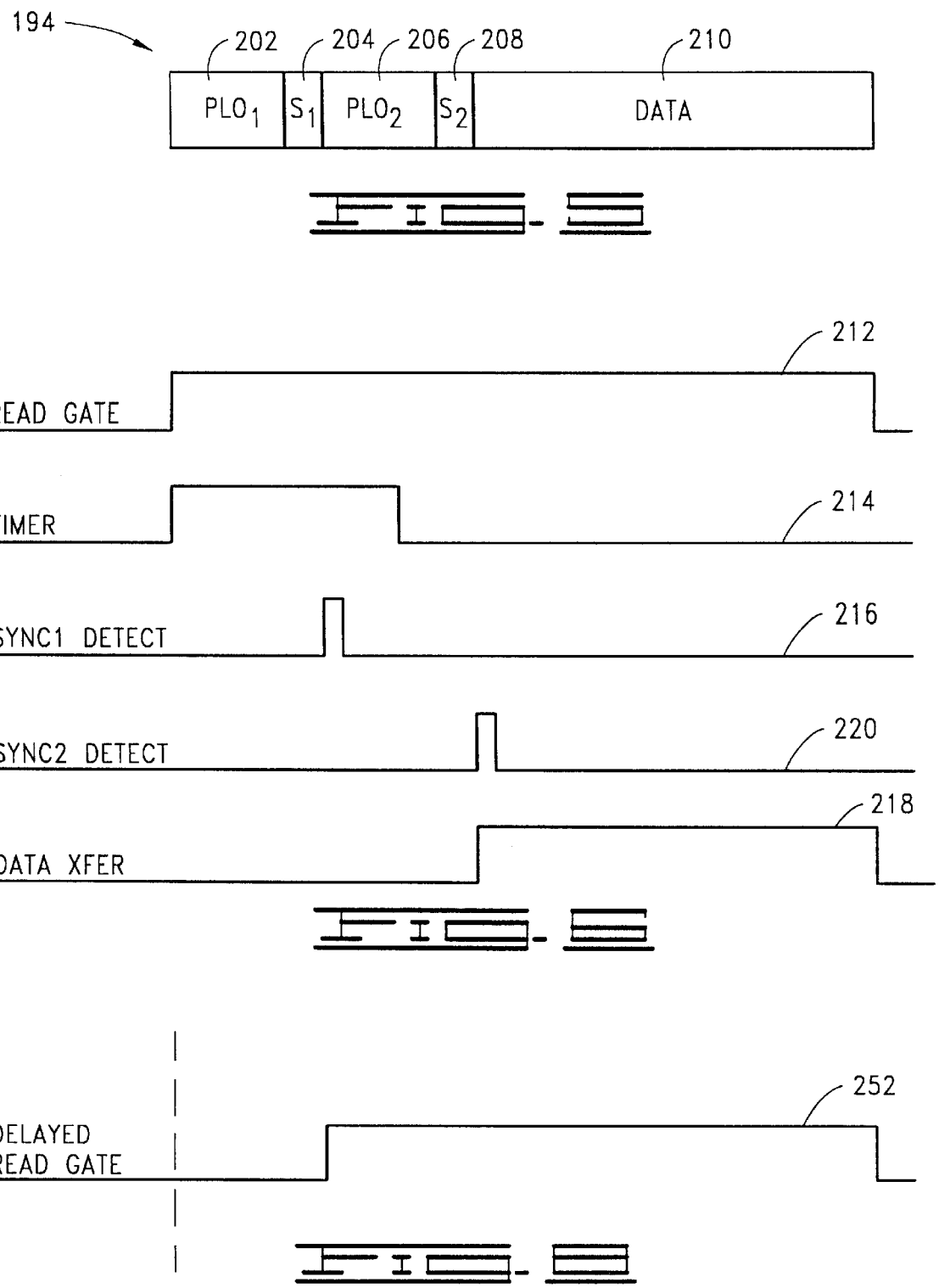

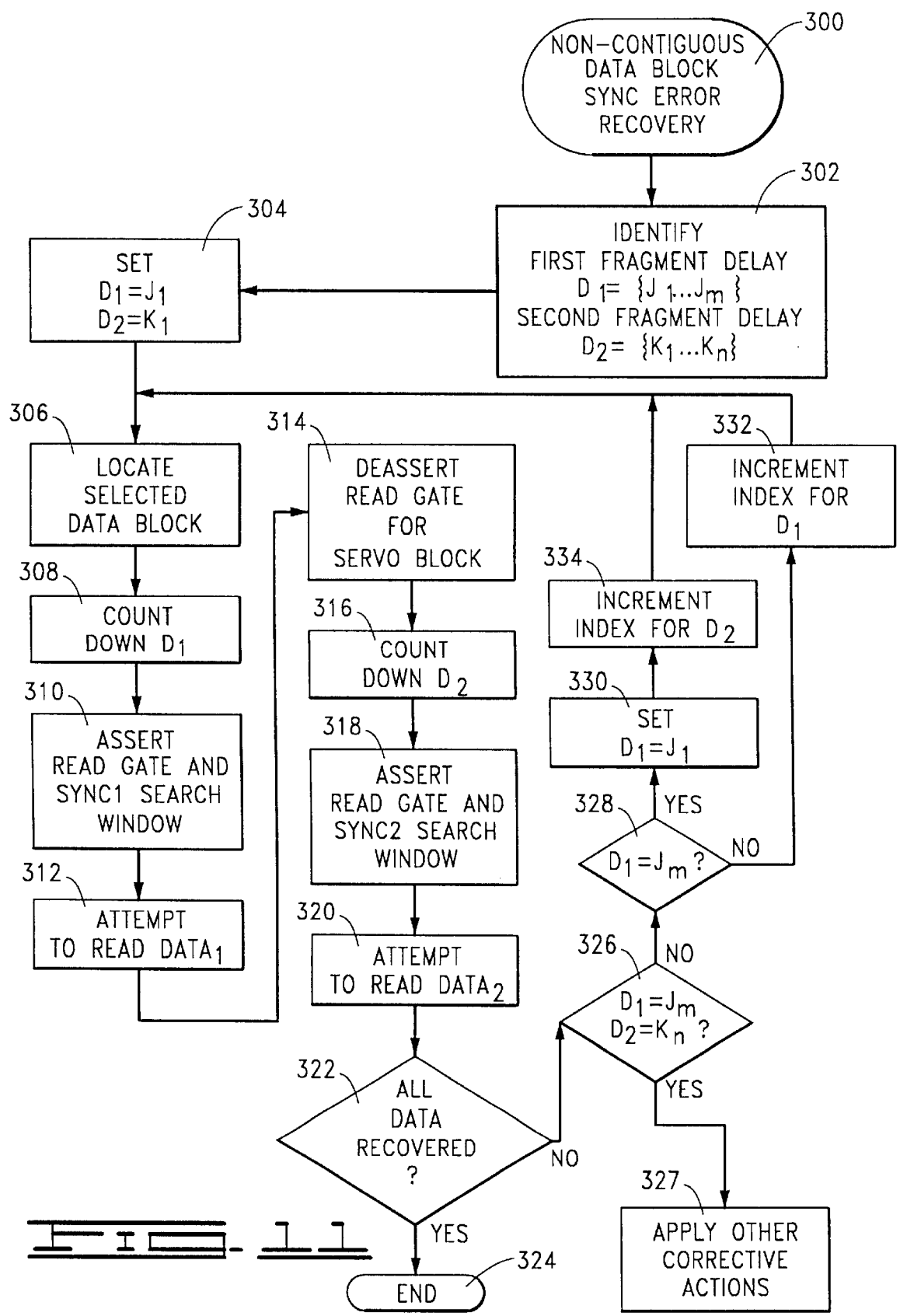

DATA RECOVERY IN A DISC DRIVE WITH REDUNDANT SYNC DATA BLOCKS

RELATED APPLICATIONS

This application is a continuation of U.S. patent application Ser. No. 09/036,739 filed Mar. 9, 1998 now U.S. Pat. No. 6,097,561, entitled DATA RECOVERY IN A DISC DRIVE WITH REDUNDANT SYNC DATA BLOCKS which claims the benefit of U.S. Provisional Application No. 60/062,194 entitled METHOD FOR IMPROVED DUAL SYNC MARK RECOVERY, filed Oct. 16, 1997.

FIELD OF THE INVENTION

This invention relates generally to the field of disc drive data storage devices, and more particularly, but not by way of limitation, to improving the read performance of a disc drive utilizing redundant synchronization fields in data blocks used to store user data.

BACKGROUND

Hard disc drives are typically utilized as primary data storage devices in modern computer systems. Such disc drives record digital data on a plurality of circular, concentric tracks on the surfaces of one or more rigid discs. The discs are axially aligned and mounted to a hub of a spindle motor for rotation at a constant high speed.

Data are stored on and retrieved from the tracks using an array of vertically aligned read/write head assemblies, or heads, which are controllably moved from track to track by a rotary actuator assembly. Each head typically comprises an electromagnetic transducer carried on an air bearing slider, which is supported over the corresponding disc surface on an air bearing established by air currents set up by rotation of the disc.

The position of the heads with respect to the tracks is controlled by a closed loop digital servo system. Servo patterns used to define the location of the heads relative to the disc surface are prerecorded on the discs during the disc drive manufacturing process. These servo patterns can be recorded exclusively on one surface of one disc and continuously read (as in a dedicated servo system), or can be interspersed among the various discs so that each track includes both servo and data blocks (as in an embedded servo system), the data blocks being used to store user data provided from a host computer in which the disc drive is mounted.

The data blocks, also sometimes referred to as "sectors", include a number of leading control fields which enable read channel circuitry of the disc drive to properly decode the user data information stored in each data block. Such control fields typically include phase-locked oscillator (PLO) and training fields to enable the read channel to set various gain and timing parameters before recovering the user data. Synchronization fields enable the channel to correctly detect the beginning of the user data stored in the data block. Thus, the control fields optimize the operation of the channel for each data access operation.

As will be recognized, continual advancements in the art have led to greater levels of data storage and transfer rate capabilities in successive generations of drives. One such advancement is the implementation of magneto-resistive (MR) heads, which utilize magneto-resistive elements having changed electrical resistances in the presence of magnetic fields of a selected orientation. Data previously stored to a data block can be detected by changes in voltage across an MR element as a read bias current is passed therethrough.

The use of MR heads has allowed disc drive designers to bring the heads ever closer to the disc surfaces. This provides the advantage of greater data recording densities, but introduces a greater likelihood of distortion in the readback signals generated by the heads due to thermal interaction between the heads and the discs. More particularly, thermal asperities (TAs) are distortion events in the head readback signals caused by changes in the temperature of the heads as the heads fly over the surfaces of the discs. TAs typically result from actual physical contact between the head and a contaminating particle oil the disc (or a localized "hill" on the disc), but can also be induced as a result of a change between the relative flying height of the head as the head passes over "hills" and "valleys" on an irregular disc surface.

TAs found in disc drives using currently available media are of a size which can span a significant number of bytes; for example, in a disc drive leaving a data transfer rate of 200 megabits per second (Mbits/sec), uncompensated thermal asperities can typically last from 2 to 5 microseconds, distorting from about 50 to 125 bytes of data. Further, it will be recognized that TAs can grow over time due to factors such as contamination and corrosion of the disc surfaces, which can significantly degrade the capabilities of a disc drive to reliably store and retrieve user data over the operational life of the drive. Localized media anomalies can also cause problems in the storage and recovery of data from the discs, preventing a disc drive from recovering data previously stored to a given data block.

To compensate for the effects of TAs and localized media anomalies, as well as other types of various anomalous conditions, a data block format has been proposed which utilizes redundant synchronization fields to improve the ability of a disc drive to recover previously stored data. More particularly, first and second synchronization (sync) fields are provided in each data block so that the data stored in the data block can still be recovered when an anomalous condition prevents the read channel from correctly decoding one of the two sync fields. More particularly, the distance separating the two sync fields in a given data block is selected to be of sufficient length so that a TA coincident with one of the sync fields does not interfere with the remaining sync field.

Alternative formatting methodologies can be used to separate the two sync fields in each data block. In one approach, a second PLO field is written in the space between the two sync fields. In another approach, a first data field is disposed between the two sync fields, with a portion of the data being stored in this first data field and the rest of the data stored in a second data field following the second sync field. In the latter approach, the amount of data stored in the first data field is selected to be within the error correcting capabilities of the read channel so that this data can be reconstructed from error correction code symbols appended to the data, should the read channel be unable to correctly detect the first sync field.

Although the redundant sync field data field format has been found to greatly enhance the ability of a disc drive to recover previously stored data, problems have been found to arise in certain circumstances, such as when the same sync pattern is used in both of the sync fields or when a redundant sync field data field is split by a servo block. Accordingly, improvements are needed to facilitate further advancements in disc drive performance, and it is to this end that the present invention is directed.

SUMMARY OF THE INVENTION

The present invention provides an apparatus and method for improving data recovery operations in a disc drive employing a redundant sync data block format.

In accordance with a preferred embodiment, the disc drive includes a rotatable disc having a plurality of nominally concentric tracks, each of the tracks having a plurality of data blocks in which user data are stored. A controllably positionable head is provided to access the data blocks and a read channel recovers the user data from readback signals generated by the head.

Each data block includes a user data field to store the user data, a first sync field and a redundant, second sync field. The sync fields store first and second sync words, respectively, which are used to synchronize the read channel with the user data so as to properly decode the user data from the user data field. That is, the sync words establish symbol boundaries within the data bit-stream to enable the read channel to discern the user data. Once the read channel detects the first sync word, the read channel can thereafter decode the user data by waiting for the passage of a predetermined number of bits in the bit-stream corresponding to the distance from the sync word to the beginning of the user data.

In one preferred embodiment, anomalous conditions that cause the detection of a selected first sync word to be late or early by one or more bits (i.e., a "mis-sync" error) are compensated by delaying the reading of the selected data block until after the first sync field has already passed the head. In such a case, the read channel is synchronized using the second sync word of the selected data block. In another preferred embodiment, anomalous conditions that interfere with the proper detection of sync words associated with a non-contiguous data block are compensated, a non-contiguous data block being split into two fragments to accommodate a coincidentally occurring servo block on the track.

These and various other features as well as advantages which characterize the present invention will be apparent from a reading of the following detailed description and a review of the associated drawings.

BRIEF DESCRIPTION OF THE DRAWINGS

FIG. 5 is a representation of a format of one of the dual sync data fields shown in FIG. 4.

FIG. 6 is a timing diagram representative of various timing windows and signals generated during the reading of the data field of FIG. 5.

FIG. 8 is a delayed read gate signal generated in accordance with the operation of the routine of FIG. 7.

FIG. 11 is a generalized flow chart for a SPLIT SECTOR RECOVERY routine representative of programming stored in memory and utilized by a system processor of the disc drive, as shown in FIG. 2.

DETAILED DESCRIPTION

In order to set forth various aspects of the present invention, it will be helpful to first briefly describe the construction and operation of a disc drive constructed in accordance with preferred embodiments of the present invention.

Figure 1:
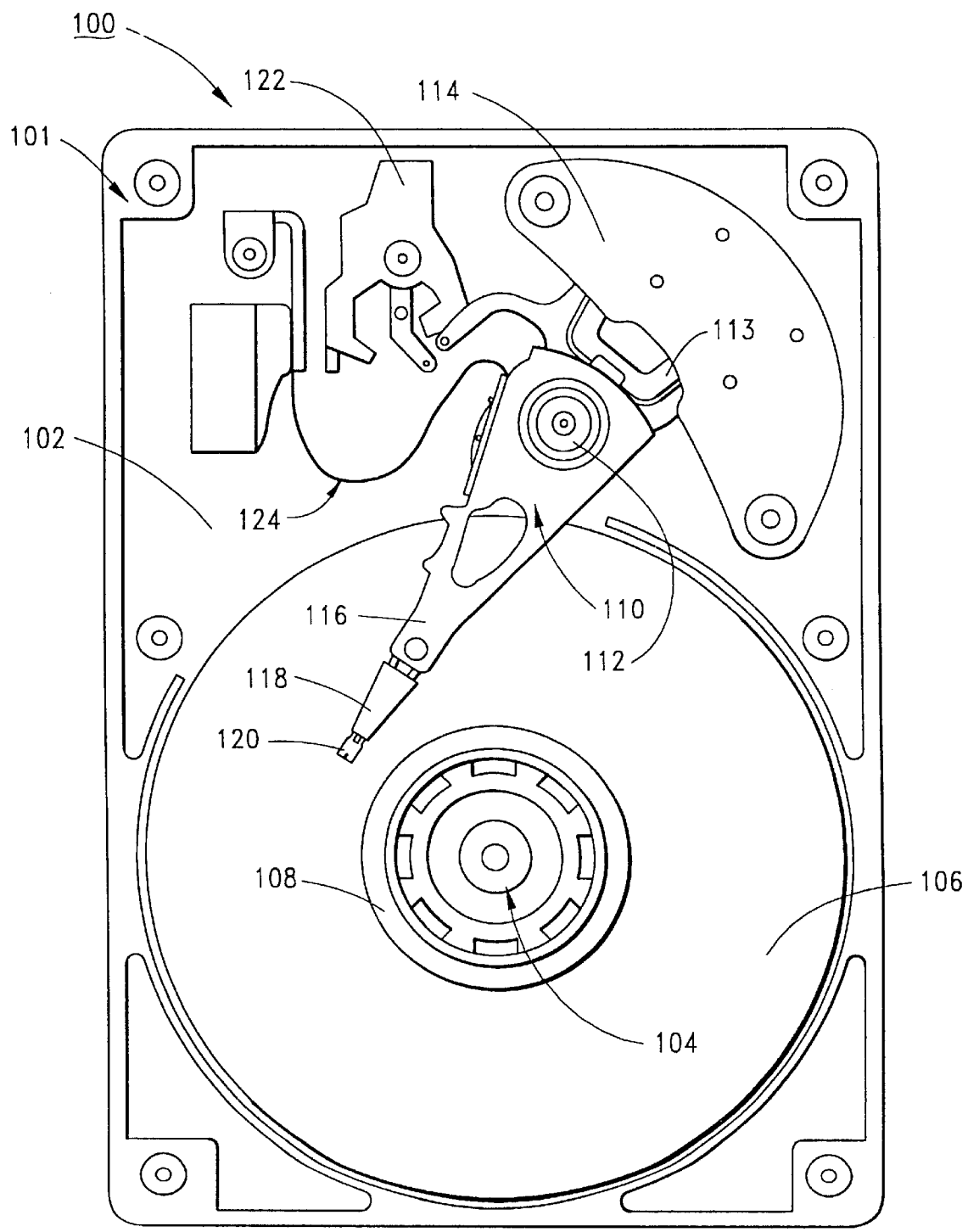
FIG. 1 is a top plan view of a disc drive constructed in accordance with preferred embodiments of the present invention.

Referring now to FIG. 1, shown therein is a top plan view of a disc drive 100, which includes a head-disc assembly (HDA) 101 and a disc drive printed wiring assembly (PWA) which is mounted to the underside of the HDA 101. Although not shown in FIG. 1, the PWA provides circuitry necessary to control the operation of the HDA 101 and to transfer data between the HDA 101 and a host computer in which the disc drive 100 can be mounted in a user environment.

As set forth in FIG. 1, the HDA 101 includes a base deck 102 to which various disc drive components are mounted. A top cover, which has been omitted from FIG. 1 to facilitate the present discussion, cooperates with the base deck 102 to form an internal environment for the disc drive 100 with controlled air pressure, humidity and cleanliness levels. A spindle motor 104 is provided to rotate a stack of discs 106 at a constant high speed, with a disc clamp 108 securing the discs 106 to the spindle motor 104.

To access the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms 116 from which corresponding flexure assemblies 118 extend. Heads 120 are provided at distal ends of the flexure assemblies 118 and are supported over the discs 106 by air bearings established by air currents set up by the rotation of the discs 106.

A latch assembly 122 is provided to secure the heads over landing zones (not designated) at the innermost diameters of the discs 106 when the disc drive 100 is deactivated. A flex circuit assembly 124 provides electrical communication paths between the actuator assembly 110 and the disc drive PWA (mounted to the underside of the disc drive 100 as mentioned above).

Figure 2:
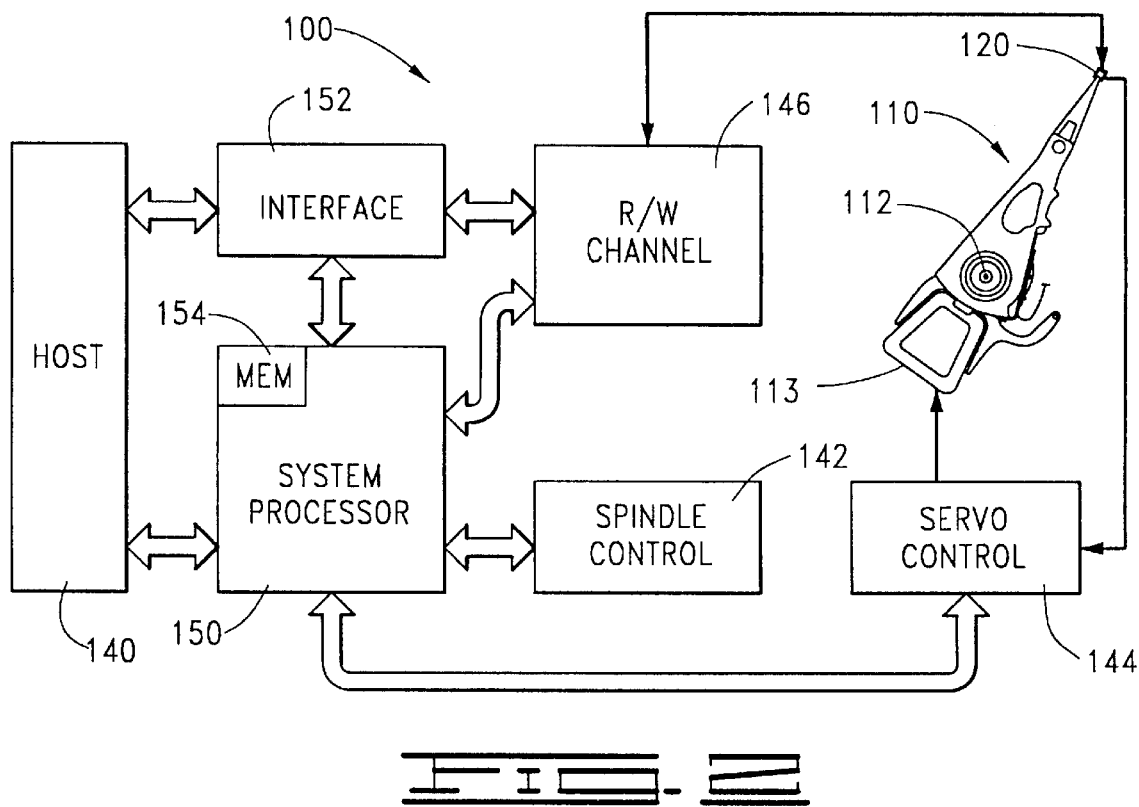
FIG. 2 is a functional block diagram of the disc drive of FIG. 1.

FIG. 2 provides a functional block diagram of the disc drive 100 of FIG. 1, operably connected to a host computer 140. As shown in FIG. 2, circuitry used to control the disc drive 100 includes a spindle control circuit 142, a servo control circuit 144 and a read/write channel 146, all operably connected to a system processor 150. It will be recognized that the system processor 150 communicates with and controls the operation of these circuits in a known manner, with the exceptions as discussed below. Additionally, an interface circuit 152 is shown connected to the read/write channel 146 and to the system processor 150, with the interface circuit 152 serving as a conventional data interface and buffer for the disc drive. The interface circuit 152 includes a sequencer (not separately shown) which comprises hardware used to establish varying timing sequences during the operation of the read/write channel 146.

The spindle control circuit 142 controls the rotational speed of the spindle motor 104 (FIG. 1). The servo control circuit 144 controls the position of the heads 120 with respect to the discs 106 by applying current to the actuator coil 113 in response to servo information read by the heads 120. The read/write channel 146 operates to write data to the discs 106 in response to user data provided to the channel from the interface circuit 152 by encoding and serializing the data and generating a write current utilized by the head 120 to magnetize portions of a selected track on the disc 106. Correspondingly, the previously stored data are retrieved by the read/write channel 146 by decoding the data from the read signals generated by the head 120 as the head passes over the selected track on the disc 106. Various operations of the disc drive 100 are controlled by the system processor 150, in accordance with programming stored in memory (MEM) 154.

Figure 3:
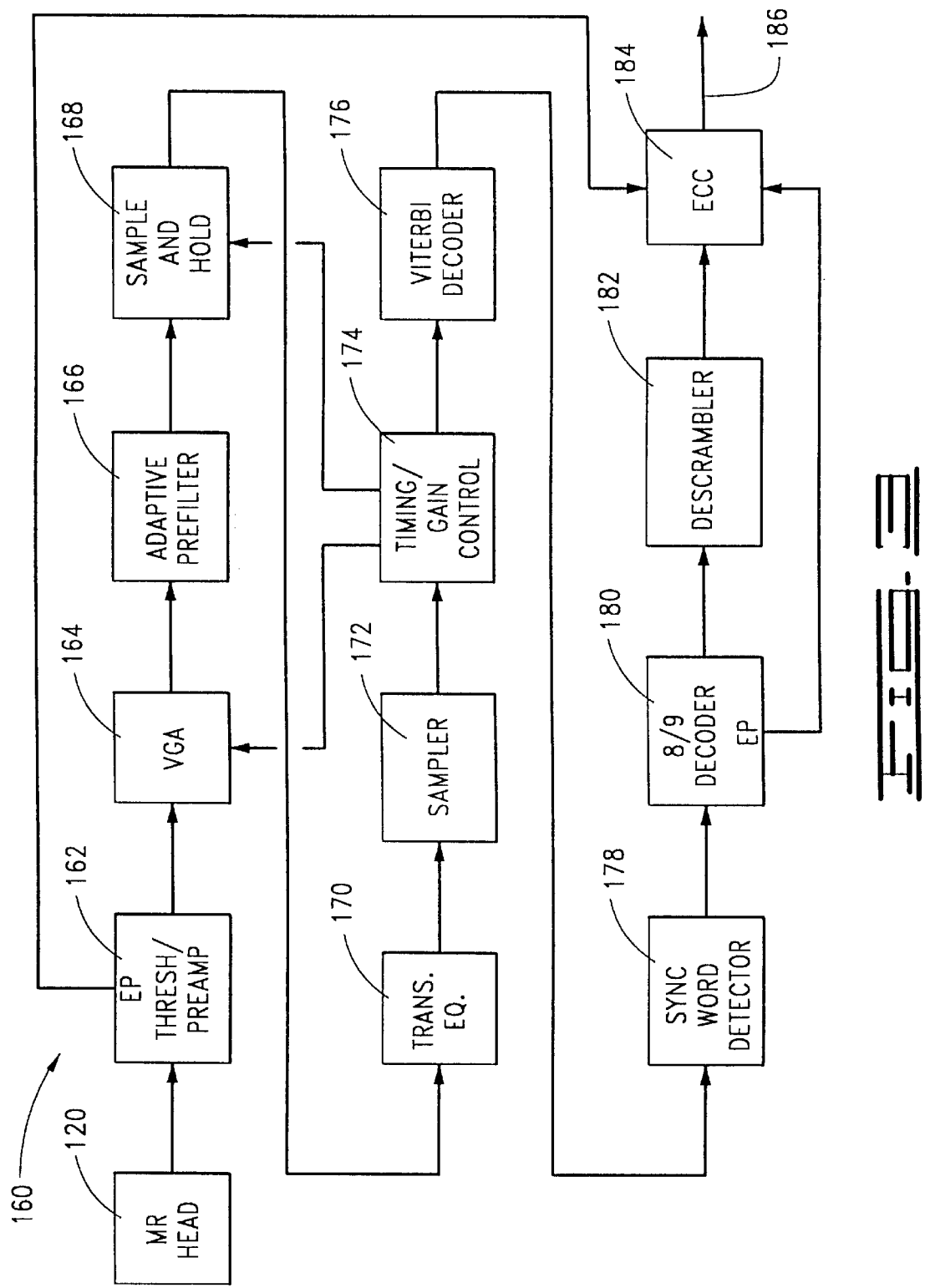
FIG. 3 is a functional block diagram of a read channel portion of the read/write channel of FIG. 2.

Referring now to FIG. 3, shown therein is a functional block diagram of a read channel 160 of the disc drive 100, the read channel 160 constituting the readback portion of the read/write channel 146 of FIG. 2. In operating to reconstruct data previously stored to the discs 106, selected operations of the read channel 160 are controlled with inputs provided by the system processor 150 and the interface circuit 152 of FIG. 2. As is typical in the art, the read channel 160 can be incorporated into one or more discrete integrated devices, such as the MS151B KingCobra EPR4 PRML Read Channel, manufactured by Lucent Technologies, Inc., Allentown, Pa., USA.

As shown in FIG. 3, the read channel 160 comprises a threshold detector and preamp circuit 162 (hereinafter also referred to as "preamp") which operates to monitor the variations in the read voltage sensed across the magneto-resistive (MR) element of the head 120, which is identified in FIG. 3 as an MR head. The preamp 162 provides threshold detection, preamplification and frequency domain filtering of the readback signal provided by the head 120. The preamp 162 further preferably includes a high pass frequency domain filtering stage which reduces the effective duration of a thermal asperity by removing a significant amount of the energy in the read signal attributable to the thermal asperity event. By selecting a suitable cutoff frequency (such as 6 megahertz), the durational effects of a typical thermal asperity event can be reduced from about 2 to 5 milliseconds down to about 300 to 500 nanoseconds. For a data transfer rate of 200 megabits per second (Mbits/sec), this results in a reduction in the number of affected bytes from 50–125 bytes down to about 8–13 bytes, which is well within the error correction capability of the read channel 160, as discussed below.

The filtered output signal from the preamp 162 is provided to a variable gain amplifier (VGA) 164, which includes an automatic gain control (AGC) stage to maintain a nominal signal amplitude for the remainder of the read channel 160. Additionally, the VGA 164 can be set to a fixed gain, useful during certain types of error recovery operations.

The amplified signal is then prefiltered by an adaptive prefilter 166 which operates as a low pass filter to remove higher frequency noise components from the signal. The frequency domain filtering characteristics of the adaptive prefilter 166 can be readily controlled through the use of control inputs (not shown) provided by the system processor 150.

The filtered output of the adaptive prefilter 166 is provided to a sample and hold circuit 168, which outputs a series of discrete values in response to the input signal received by the circuit. These discrete values are transmitted to a transversal equalizer 170, which provides time domain equalization of the readback signal, filtering the signal to a close approximation of a selected class of partial response, maximum likelihood (PRML) signal processing (in this case EPR-4).

The output of the transversal equalizer 170 is sampled (digitized) by a sampler 172, and these samples are used by a timing and gain control circuit. 174 to adjust the gain of the VGA 164. The timing and gain control circuit 174 further provides timing inputs to the sample and hold circuit 168 and to a phase locked loop (PLL, not separately shown) used by a Viterbi decoder 176 to decode read data from the samples obtained from the transversal equalizer 170.

The output from the Viterbi decoder 176 will comprise a digitally expressed data sequence corresponding to the encoded data originally written to the selected track. This output data sequence is provided to a sync word detector 178 which, when enabled by the sequencer of the interface circuit 152, proceeds to examine each successive set of bits in the output data sequence, searching for a unique pattern which enables the read channel 160 to decode the user data. This unique pattern, or sync word, provides an indication of the data symbol boundaries within the recovered data bit-stream, thereby providing for correct decoding of the user data from the data field.

After passing through the sync word detector 178, the data sequence is provided to an 8/9 decoder 180, which converts each set of 9 bits stored to the disc 108 back to the original 8 bits of input data to remove the run length limited (RLL) encoding used to ensure reliable timing during the read recovery process. Although 8/9 encoding has been disclosed, it will be understood that other encoding rates can readily be utilized, such as 16/17. The output from the 8/9 decoder 178, which is typically characterized as a series of n-bit words, or symbols, is provided to a descrambler 182, which performs a selected logical operation upon each symbol using a set of descrambling words (or "keys") that rotate through a known sequence.

The output sequence from the descrambler 182 is provided to an error correction code (ECC) circuit 184, which performs error detection and correction upon the received sequence (using, for example Reed-Solomon codes) to correct up to a selected number of erroneous data symbols. When no uncorrectable errors are present, the ECC circuit 184 outputs the recovered user data on signal path 186 to the interface circuit 152 (FIG. 2) for subsequent transfer to the host computer 140. Erasure pointers are provided to the ECC circuit 184 by the preamp 162 and the 8/9 decoder 180 indicating selected symbols that may contain errors, in order to further enhance the operation of the ECC circuit 184.

Having concluded an overview of the construction and operation of the disc drive 100, the manner in which servo information and user data fields are organized on individual tracks and associated problems with the recovery of the user data therefrom will now be discussed, beginning with FIG. 4.

Figure 4:
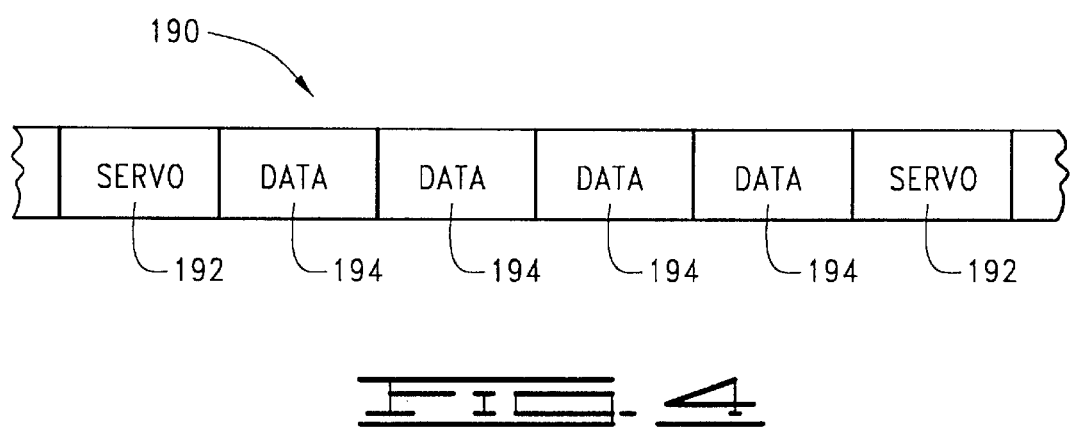
FIG. 4 is a representation of a portion of one of a plurality of tracks defined on the discs shown in FIG. 1.

As shown in FIG. 4, a portion of a selected track 190 includes a number of servo blocks 192 interspersed with data blocks 194. In accordance with known servo track writing techniques, the servo blocks 192 are written to the discs 106 during disc drive manufacturing and are arranged on the discs 106 as a plurality of radially extending wedges, like spokes on a wheel. The data blocks 194 are subsequently defined in the regions between the servo blocks 192 during a disc drive formatting operation. Header blocks (not shown) can optionally be used to provide additional information with regard to the logical addresses of associated data blocks 194.

The general format for a selected one of the data blocks 194 is shown in greater detail in FIG. 5. More particularly, the data block 194 of FIG. 5 is characterized as a redundant sync data block and includes a first phase locked oscillator field 202 (PLO$_1$), a first synchronization field 204 (S$_1$), a second phase locked oscillator field 206 (PLO$_2$), a second synchronization field 208 (S$_2$), and a user data field 210 (DATA). It will be recognized that the relative lengths of the various fields shown in FIG. 5 have not been drawn to scale; for example, when actually disposed on one of the discs 106, the data field 210 will typically be much longer than the combined lengths of the remaining fields in the data block 194.

The phase locked oscillator fields 202, 206 are preferably written using an oscillating 2T pattern which, when read, enables the read channel 160 (FIG. 3) to acquire the necessary timing and amplitude initialization information for the subsequent reading of the user data stored in the user data field 210. The phase locked oscillator fields 202, 206 each further preferably comprise a training portion (not separately shown) having a series of randomized data enabling the read channel 160 to further optimize the tap weights used by the transversal equalizer 170 (FIG. 3). Although shown in FIG. 5 to be somewhat equal in length, it will be readily understood that the length of the PLO$_1$, field 202 is substantially longer than the length of the PLO$_2$ field 206.

The sync fields 204, 208 provide timing information with regard to the user data stored in the user data field 210. That is, the sync fields 204, 208 enable the read channel 160 to obtain phase and frequency lock so that the read channel is ready to begin receipt of the user data from the user data field 210 at the appropriate time. For purposes of clarity, the sync word stored in the S$_1$ field 204 will be referred to as "sync1", and the sync word stored in the S$_2$ field 208 will be referred to as "sync2".

In a preferred embodiment, both sync1 and sync2 comprise the same 22-bit sync word (such as "00 0001 1000 0001 1011 0110"). Sync1 and sync2 are selected to have a maximum Hamming distance from all combinations of symbols likely to be stored in the data block 194. Moreover, the sync word detector 178 of the read channel 160 is fault-tolerant, in that sync1 and sync2 can be correctly detected even when up to a selected number of mismatched bits are present.

Accordingly, the read channel 160 normally operates in one of three selectable modes, as set forth in the following table.

TABLE 1

Mode 1 Initiate timer at read gate; assume any detected sync word during timer is sync1; assume any detected sync word after timer is sync2
Mode 2 Assume any detected sync word is sync1
Mode 3 Assume any detected sync word is sync2

As set forth by Table 1, the first mode of operation, Mode 1, comprises the initialization of a timer to establish a sync detection window coincident with the reading of each data block 194. Any sync word detected while the sync detection window is open is assumed to be sync1, whereas any sync word detected after the sync detection window is closed is assumed to be sync2. The remaining modes of operation are somewhat more straightforward, in that Mode 2 simply assumes any detected sync word is sync1 and Mode 3 assumes any detected sync word is sync2.

To illustrate the operation of the read channel 160 in these various modes, FIG. 6 has been provided to show a number of timing windows and signals generated during typical read operations upon the data block 194 of FIG. 5. For clarity, FIGS. 5 and 6 have been vertically aligned so that portions of the signals of FIG. 6 nominally align with corresponding portions of the data block 194 of FIG. 5.

As will be understood, at the beginning of a read operation during which the user data stored in the data block 194 are to be retrieved, the associated head 120 is moved to the selected track 190 and the sequencer (of the interface circuit 152 of FIG. 2) waits until the selected data block 194 passes under the head 120. At such point that the selected data block 194 approaches the head, the sequencer opens a read window (also referred to as the assertion of a read gate), as shown by READ GATE signal 212 of FIG. 6. The signal 212, when asserted, nominally defines a period of time during which the read channel 160 is enabled to read the data block 194.

When the read channel 160 is in Mode 1, a timer is initiated coincident with the opening of the read gate to establish a search window (indicated by TIMER signal 214), during which the sync word detector 178 (FIG. 3) searches for a valid sync word in the recovered sequence. Detection of sync1 (indicated by SYNC1 DETECT signal 216) while the search window is open enables the read channel 160 to time the subsequent decoding of data from the user data field 210, as indicated by DATA XFER signal 218. When the read channel 160 fails to detect sync1 during the timing window, but subsequently detects sync2 after the timing window is closed (as indicated by SYNC2 DETECT signal 220), the read channel will synchronize and transfer the data from the user data field 210 using sync2.

When the read channel 160 is in Mode 2, the read channel will assume that the first detected sync word is sync. Hence, under normal circumstances sync1 will be properly detected and the data in the user data field 210 will be correctly decoded. A drawback to operation in Mode 2, however, is that when an anomalous condition prevents proper detection of sync1, the first sync word detected by the read channel 160 will he sync2, causing the read channel 160 to begin incorrectly decoding the user data field 210 some number of bytes after the field has already begun to pass under the head 120. In such a case Mode 3 could be used during a subsequent error recovery operation to recover the data by synchronizing from sync2.

From the foregoing discussion it may appear that optimal drive performance could be obtained by normally operating in Mode 1, and resorting to Modes 2 and 3 only during successive read error recovery attempts. In practice, however, considerations such as minimizing format overhead may make the ideal use of Mode 1 impractical. Inevitable uncertainties in read and write timing caused by spindle speed variations and clock synchronizations affect the accuracy of the sync1 search window relative to the positions of sync1 and sync2 in the recovered data stream. Thus, it is difficult under worst-case conditions to ensure that a fixed size sync1 search window will always close when the head 120 is over the PLO$_2$ field 206 (i.e., after the first sync field 204 and before the second sync field 208) in every data block 194, unless the PLO$_2$ field is made undesirably large. Accordingly, it has been found advantageous in some cases to normally operate in Mode 2 and to utilize the redundant sync field 208 only in those cases where an anomalous condition prevents proper detection of sync1.

Of greater significance, however, is the fact that due to the fault-tolerant nature of the sync word detector 178, it is possible to obtain a "late" detection of one of the sync words. That is, certain types of anomalous conditions proximate one of the sync words have been found to cause a detection that is 1–2 bits early or late. Accordingly, such "mis-sync" errors prevent the read channel 160 from correctly decoding the user data in the data field 210.

Significantly, none of the above modes of operation can successfully recover from this type of error. For example, when sync1 exhibits a mis-sync error, Mode 1 will nominally still detect sync1, but such detection will be late (or early), preventing recovery of the user data. Mode 2 will likewise provide a late (or early) sync1 detection. Mode 3 will also misdetect sync1, and further mistakenly assume it is sync2.

Figure 7:
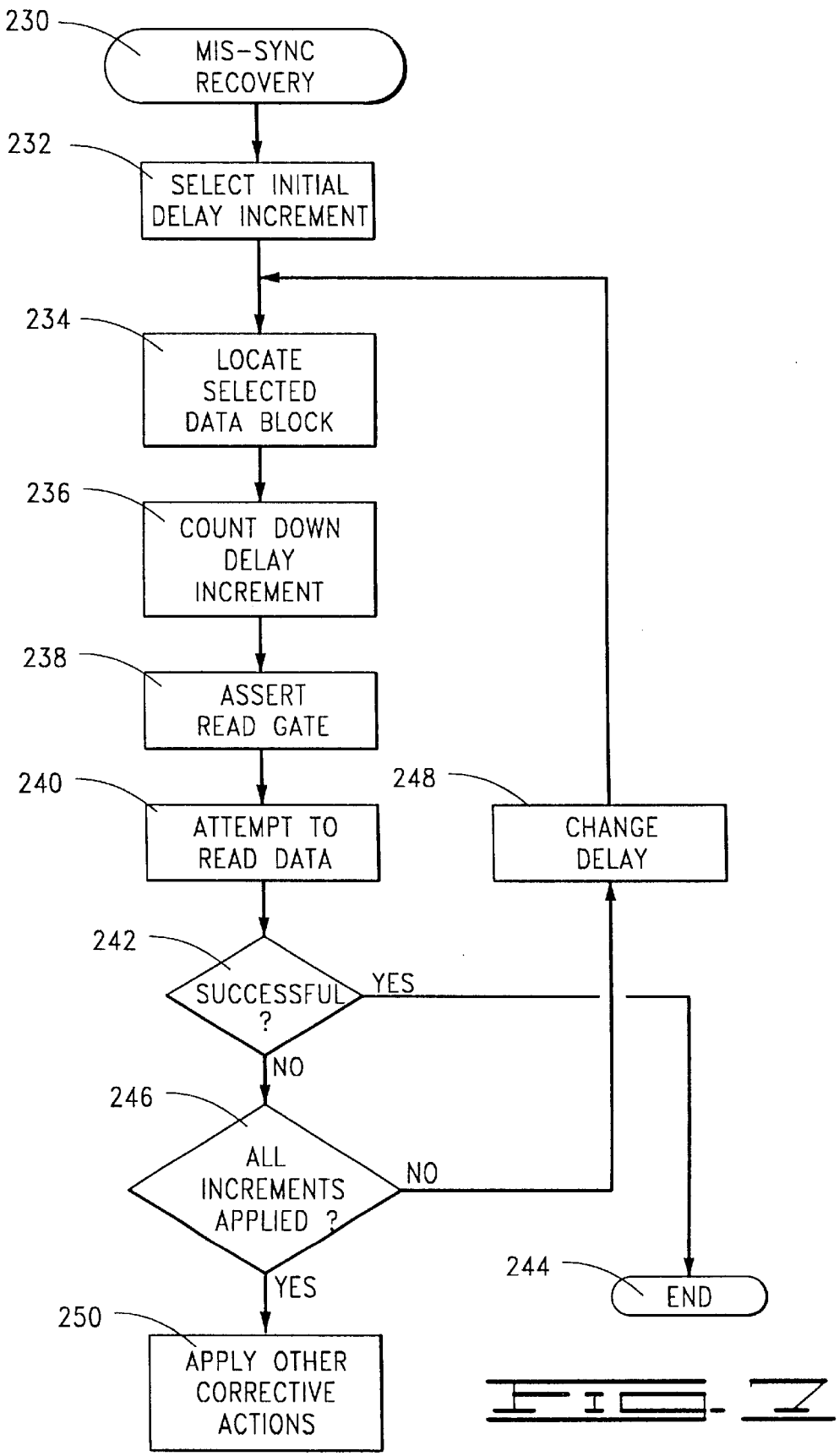
FIG. 7 is a generalized flow chart for a MIS-SYNC RECOVERY routine representative of programming stored in memory and utilized by a system processor of the disc drive, as shown in FIG. 2.

Accordingly, to address the problem of mis-sync detections, FIG. 7 has been provided which sets forth a MIS-SYNC RECOVERY routine, illustrative of programming stored in MEM 154 (FIG. 2) and utilized by the system processor 150 in accordance with a preferred embodiment of the present invention. However, the steps performed by the routine of FIG. 7 could alternatively be incorporated into hardware or software executed directly by the sequencer of the interface circuit 152. The routine is preferably performed during a read error recovery operation during which the read channel 160 attempts to recover the user data from a selected data block (such as 194 of FIG. 5).

Generally, the MIS-SYNC RECOVERY routine operates to delay the opening of the read gate signal (212 in FIG. 6) by an amount sufficient to avoid the $S_1$ field 204, thereby skipping sync1 entirely. This is accomplished by first selecting an initial delay increment and then delaying the opening of the read gate by this increment. For example, in one embodiment it was found that opening the read gate seven or less bytes before the $S_1$ field 204 wholly prevented detection of the $S_1$ field 204, due to the initialization time required by the read channel 160.

Accordingly, as shown in FIG. 7 the routine selects the initial delay increment at block 232. Once the selected data block 194 with which the mis-sync error is associated reaches the head 120 on the next revolution of the disc 106, block 234, the sequencer counts down the delay increment, block 236, and then opens (asserts) the read gate, block 238. Once the read gate is asserted, the read channel 160 operates in Mode 3 to attempt the recovery of the user data from the data field 210 with sync2, as indicated by block 240.

The routine next determines whether the data was successfully recovered from the data block 194, as indicated by decision block 242; if so, the routine ends at block 244. If data recovery was unsuccessful, however, the routine next determines if all delay increments have been applied by decision block 246; if not, a new delay increment is applied (block 248) and the routine returns to block 234. It is contemplated that a relatively smaller delay increment can be initially selected, with this increment being increased with each pass through the routine in order to account for worst case variations in timing and rotational speed.

Finally, when all increments have been applied without successful recovery of the data, the routine of FIG. 7 passes from decision block 246 to block 250, wherein other corrective measures of a conventional nature are applied in an attempt to recover the data. Additional steps, such as reallocation of the data block, are also contemplated as desired.

Accordingly, the routine of FIG. 7 operates to variably delay the opening of the read gate, as indicated by DELAYED READ GATE signal 252 of FIG. 8, in an attempt to avoid sync1 entirely and to use sync2 to synchronize and recover the data from the user data field 210.

Having concluded the discussion of mis-sync error recovery with respect to FIGS. 5–8, a second problem associated with redundant sync data block formats will now be discussed.

As will be recognized, the data blocks 194 are defined on the discs 106 in the areas between adjacent servo blocks 192 (as previously shown in FIG. 4). As is often the case, after a number of data blocks have been placed between two adjacent servo blocks there remains enough room to get a portion of, but not another complete, data block between the adjacent servo blocks. Accordingly, to maximize data storage capacities it is common for disc drives to split up a data block so that a portion of the data block falls before, and the remaining portion of the data block follows after, a coincident servo block. Such a split data block is sometimes referred to as a "non-contiguous data block."

Figure 9:
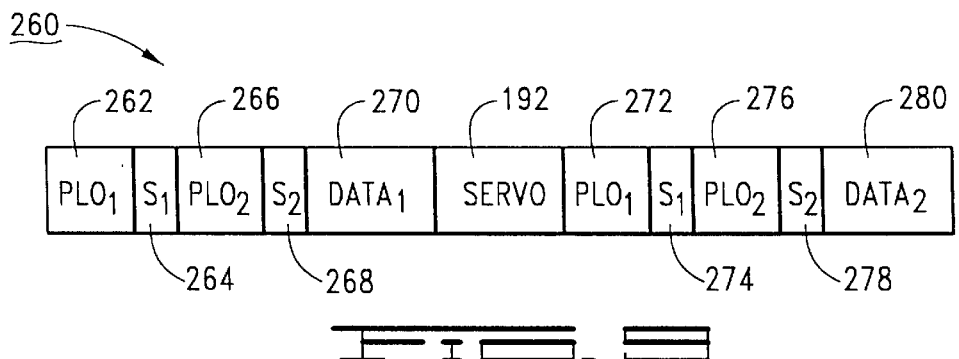
FIG. 9 is a representation of a format of a dual sync data field which is similar to that shown in FIG. 5, except that the data field of FIG. 9 is non-contiguous, being split by a servo field on the associated track on which the data field is disposed.

Turning to FIG. 9, shown therein is a non-contiguous redundant sync data block 260 which is formatted in accordance with a preferred embodiment of the present invention. More particularly, FIG. 9 shows the data block 260 to comprise a first fragment disposed immediately before the servo block 192, the first fragment comprising a first PLO field 262 ($PLO_1$), a first sync field 264 ($S_1$), a second PLO field 266 ($PLO_2$), a second sync field 268 ($S_2$) and a first user data field 270 ($DATA_1$), all of which are disposed before a coincident servo block 192.

Likewise, following the servo block 192 is a second fragment having a first PLO field 272 ($PLO_1$), a first sync field 274 ($S_1$), a second PLO field 276 ($PLO_2$), a second sync field 278 ($S_2$) and a second user data field 280 ($DATA_2$). As will be recognized, the combined user data storage capacity of the $DATA_1$ and $DATA_2$ fields 270, 280 of the non-contiguous data block 260 of FIG. 9 is equal to the data storage capacity of the contiguous data block 194 of FIG. 5. Moreover, the relative data storage capacities of the $DATA_1$ and $DATA_2$ fields 270, 280 depend upon the location of the coincident servo block 192 with respect to the leading edge of the data block 260. It is contemplated that the sync words stored in the $S_1$ and $S_2$ fields 264, 268, 274, 278 are preferably the same 22-bit word utilized in the contiguous data block 194 discussed above.

Figure 10:
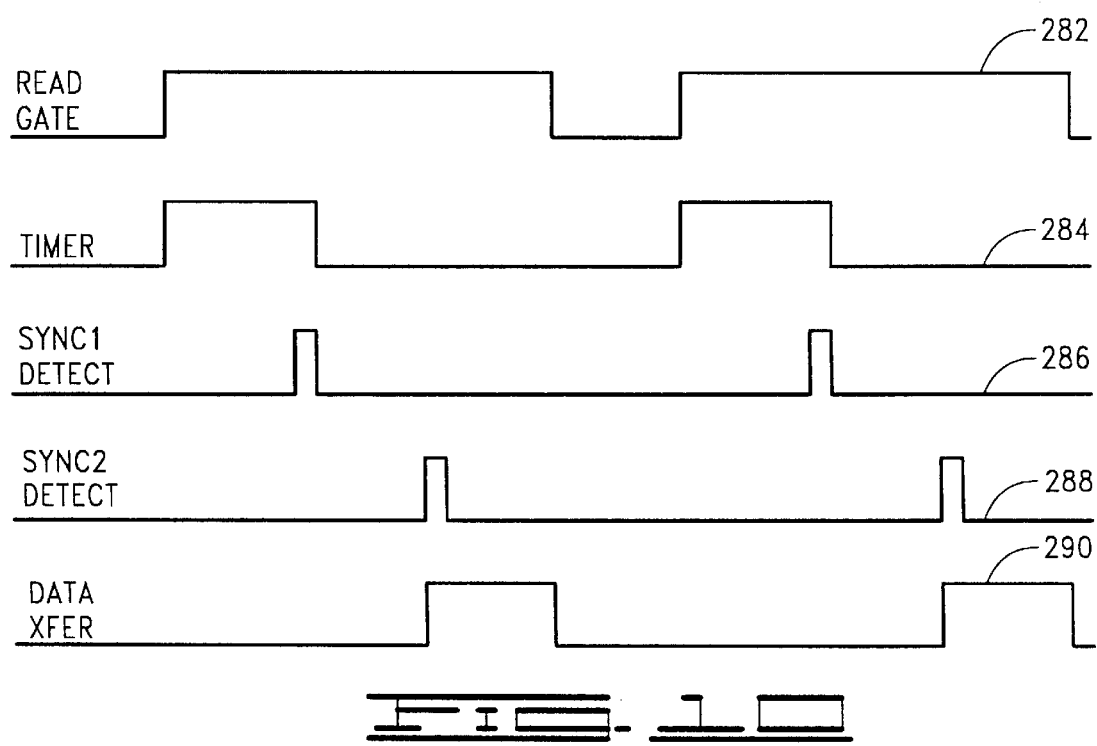
FIG. 10 is a timing diagram representative of various timing windows and signals generated during the reading of the data field of FIG. 9.

FIG. 10 provides a series of timing windows and signals generated during typical read operations upon the data block 260. As will be understood from the following discussion, the read channel 160 operates to read the non-contiguous data block 260 much the same way it reads the contiguous data block 194 of FIG. 5. That is, in a manner similar to that discussed above, the sequencer asserts a READ GATE signal 282 at such times that the first and second fragments of the data block 260 are disposed under the associated read head 120. As shown in FIG. 10, however, the READ GATE signal 282 is temporarily deasserted at such time that the coincident servo block 192 passes under the head 120. For purposes of clarity, it will be noted that the head 120 proceeds to read the servo information stored in the coincident servo block 192, but this servo information is passed to the servo control circuit 144 (FIG. 2), and not to the read channel 160.

When the read channel 160 is operating in Mode 1, the sequencer establishes sync search windows (indicated by TIMER signal 284 of FIG. 10), demarcating times during which detected sync words are assumed to be sync1, as before. The detection of sync1 and sync2 are indicated by SYNC1 DETECT signal 286 and SYNC2 DETECT signal 288, respectively; likewise, the transfer of the data stored in the $DATA_1$, $DATA_2$ fields 270, 280 is shown by DATA XFER signal 290.

Mode 1 would appear to be the optimal choice for normal read operations, but as discussed above, worst-case timing variations have been found to limit the practicability of fixed sync search windows. It has therefore been found advantageous in some cases to normally operate in Mode 2, and to resort to Modes 1 and 3 during sync error recovery operations. It will be noted that, because the operational mode of the read channel 160 cannot be changed instantaneously, the same mode must be used for both fragments of each non-contiguous data block 260. It will be further noted that, because the servo blocks (such as 192) are used to provide timing inputs, timing uncertainty will generally be greatest just before each servo block 192 and will be the least just after each servo block 192.

Accordingly, the user data stored in the non-contiguous data block 260 cannot always be readily recovered whenever a selected one of the sync fields 264, 266, 274, 276 is adversely affected by an anomalous condition. By way of illustration, when an anomalous condition prevents detection of the $S_1$ field 264, Mode 3 can be used to recover the data from $DATA_1$ field 270 using the $S_2$ field 268; however, after the servo block 192 passes the head, the read channel (which will still be in Mode 3) will misidentify the $S_1$ field 274 as the $S_2$ field 278, thereby preventing proper decoding of the user data from the $DATA_2$ field 280. Conversely, if an anomalous condition prevents detection of the $S_2$ field 268, Mode 2 will enable data to be recovered from the $DATA_1$ field 270, but not from the $DATA_2$ field 280. Mode 1 is difficult to use with non-contiguous data blocks such as 260 because of the large timing uncertainties associated with the first fragment (due to the relatively long time since the occurrence of the previous servo block 192).

To address this problem, FIG. 11 has been provided which illustrates a NON-CONTIGUOUS DATA BLOCK SYNC ERROR RECOVERY routine 300, representative of programming stored in MEM 154 (FIG. 2) and utilized by the system processor 150 in accordance with a preferred embodiment of the present invention. However, the steps performed by the routine of FIG. 11 could likewise be incorporated into hardware or software executed by the sequencer of the interface circuit 152. The routine is preferably performed as part of a read error recovery operation during which the read channel 160 attempts to recover the user data from a non-contiguous data block (such as 260 of FIG. 9).

Figure 12:
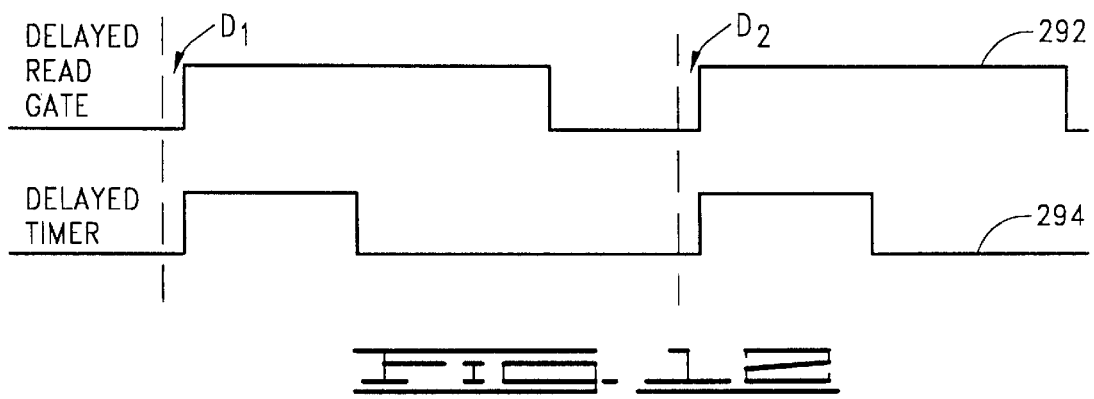
FIG. 12 is a delayed read gate signal generated in accordance with the operation of the routine of FIG. 11.

Generally, the routine of FIG. 11 attempts to recover the data stored in a selected non-contiguous data block 260 with the read channel 160 operating in Mode 1. This is accomplished by individually, variably delaying the opening of read gate and sync1 search windows for the first and second fragments of the data block 260. Such delays are diagrammatically represented in FIG. 12 which shows a DELAYED READ GATE signal 292 and a DELAYED TIMER signal 294, which are delayed by selectable delays $D_1$ and $D_2$ in a manner which will now be discussed with reference to FIG. 11.

As shown at block 302, a set of delays $\{J_l$ to $J_m\}$ are initially identified for the first fragment delay $D_1$, and a second set of delays $\{K_l$ to $K_n\}$ are initially identified for the second fragment delay $D_2$. The delay sets preferably comprise a sequence of delay values, such as 0 bytes, 3 bytes, 6 bytes, etc., depending upon the resolution desired.

The delays $D_1$ and $D_2$ are set to initial values at block 304, with $D_2$ preferably set to 0 bytes (i.e., zero delay). At block 306, the routine operates to locate the selected non-contiguous data block 260. As the selected data block begins to pass under the head 120, the routine initiates a countdown of the delay $D_1$, block 308, after which the read gate and sync1 search window are opened for the first fragment, block 310.

At block 312, the read channel 160 attempts to recover the user data from the $DATA_1$ field 270, which as discussed above requires proper detection of either the sync1 or sync2 word from the $S_1$, $S_2$ fields 264, 268 (FIG. 9). The read gate is temporarily deasserted as the servo block 192 passes under the head 120, block 314, after which the routine initiates a countdown of the delay $D_2$, block 316. As discussed above, the delay $D_2$ is initially set to zero.

Once the delay $D_2$ has timed out, the read gate and sync1 search window are asserted, block 318, and the read channel 160 attempts to recover the user data from the $DATA_2$ field 280 (FIG. 9), such recovery dependent upon the proper detection of either the sync1 or sync2 word from the $S_1$, $S_2$ fields 274, 278.

The routine next determines whether all of the data has been successfully recovered from the $DATA_1$ and $DATA_2$ fields 270, 280, as indicated by decision block 322. If so, the routine ends at 324. However, if this first pass through the routine was unsuccessful, the routine passes to decision block 326 wherein a determination is made whether all combinations of delays $D_1$, $D_2$ have been tried without success. When this is true, the routine has failed to recover the data and so other, conventional corrective actions are applied, block 327.

However, when other combinations of delays $D_1$, $D_2$ remain to be tried, the flow passes from decision block 326 to block 328, where the routine next determines whether the delay $D_1$ is presently set at the last delay value previously identified at block 302 (i.e., whether $D_1$ is equal to $J_m$). This determination is performed because the routine of FIG. 11 holds the second delay $D_2$ constant while it incrementally cycles through and applies each of the values for the first delay $D_1$. Once all of the values of the first delay $D_1$ have been applied for a particular value of the second delay $D_2$, the value of the second delay $D_2$ is incremented and the first delay $D_1$ is cycled through again. This operation is shown by blocks 328, 330, 332 and 334.

Accordingly, the routine of FIG. 11 steps through and independently varies the opening of the read gate and sync1 search windows in an effort to hit upon a combination of delays $D_1$, $D_2$ that enables the data stored in the data block 260 to be successfully recovered.

It will be noted that the routines of FIGS. 7 and 11 are somewhat similar in that both generally operate to delay the assertion of the read gate in an effort to enhance the sync word detection capabilities of the read channel 160. Moreover, it is contemplated that the routines can be applied sequentially as required during read error recovery operations. For example, the Mode 3 recovery approach set forth by FIG. 7 could be advantageously applied to a non-contiguous data block (such as 260) experiencing mis-sync errors; likewise, the Mode 1 recovery approach set forth by FIG. 11 could be readily modified for use with contiguous data blocks (such as 194).

In view of the foregoing, it will be recognized that the present invention is directed to an apparatus and method for improving data recovery operations in a disc drive employing a redundant sync data block format. The disc drive includes a rotatable disc (such as 106) and a controllably positionable head (such as 120) which is used to store user data in a plurality of data blocks (such as 194, 260) on tracks (such as 190) of the disc. Each data block includes a user data field (such as 210, 270, 280) to store user data, a first sync field (such as 204, 264, 274) and a redundant, second sync field (such as 208, 268, 278), the sync fields storing first and second sync words, respectively, which are used to synchronize a read channel (such as 160) of the disc drive.

User data are recovered from a selected data block by initiating a delay of selected duration (such as 236, 308, 316) during which a first portion of the selected data block passes proximate the head, allowing the second, remaining portion of the selected data block to be read at the completion of the delay (such as 238, 240, 310, 312, 318, 320). Data can thus be recovered in the presence of anomalous conditions which interfere with the detection of the sync words from the first and second sync fields.

For the purposes of the claims appended below, the phrase"contiguous data block" will be understood consistently with the foregoing discussion to described in a data block such as shown in FIG. 5 that does not have a servo field coincident with user data portions of the data block. Likewise, the phrase "non-contiguous data block" will be understood consistently with the foregoing discussion to describe a data block such as shown in FIG. 9 which does have a coincidently occurring servo block.

Additionally, the term"recovery means for recovering the data from the disc" includes the following structural features of the disc drive 100 of FIG. 1:

Data tracks (such as 190) on a disc (such as 106) storing a plurality of data blocks (such as 194, 260). Each data block includes a user data field (such as 210, 270, 280), a first sync field (such as 204, 264, 274) and a redundant sync field (such as 208, 268, 278). A processor (such as 150) programmed with a sync error recovery routine controlling operation of a read/write channel (such as 146) to recover the data during data recovery operations. The processor directs recovery of the data by executing error recovery routine steps (such as shown by FIG. 7, FIG. 1). And, an interface circuit (such as 152) with a sequencer establishing varying timing sequences of the read/write channel during data recovery operations. Alternatively, the sync error recovery routine may be incorporated into hardware or software executed directly by the sequencer. In either embodiment, the data being operated on is provided by a controllably positionable head (such as 120) reading data from each data block as the disc rotates each data block beneath the head.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive, comprising:

a read/write head adjacent a rotatable disc on which data are magnetically stored; and recovery means for recovering the data from the disc.

* * * * *